Figures 11, 12, 13:
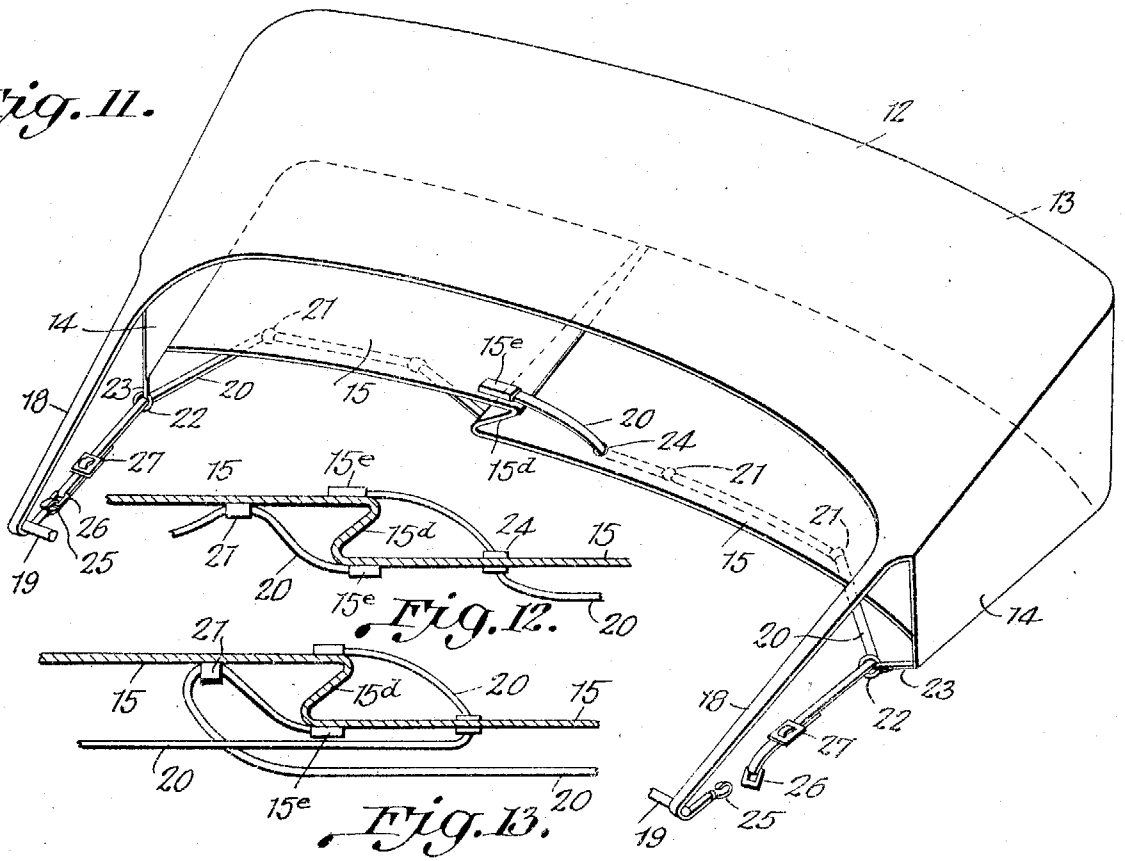

A. G. McGREGOR.
AUTOMOBILE HOOD.
APPLICATION FILED OCT. 9, 1918.
Reissued Dec. 10, 1918.
14,559.
4 SHEETS—SHEET 1.
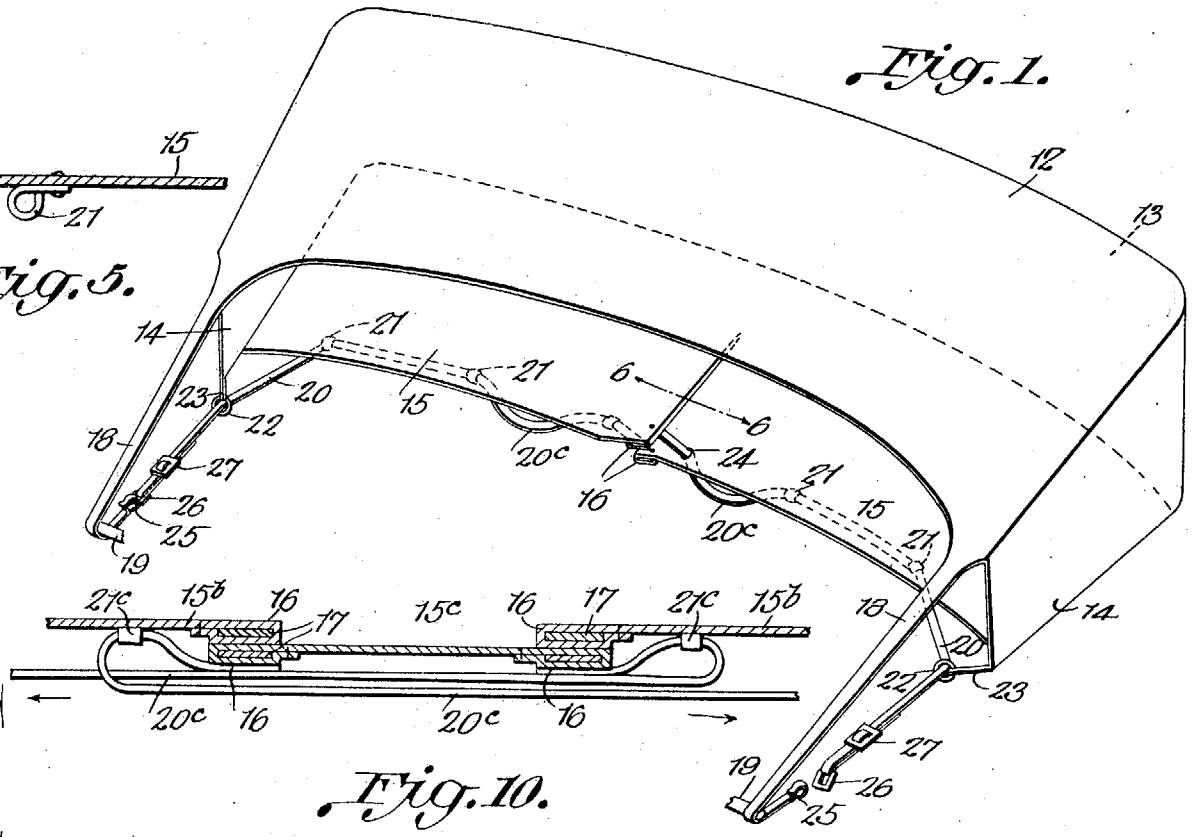
Inventor:
Alexander G. McGregor
by Calvert & Calvert
Attys.
THE ROBERT PETERS CO., PHOTO-LITHO., WASHINGTON, D. C.

A. G. McGREGOR.
AUTOMOBILE HOOD.
APPLICATION FILED OCT. 9, 1918.
Reissued Dec. 10, 1918.
14,559.
4 SHEETS—SHEET 2.
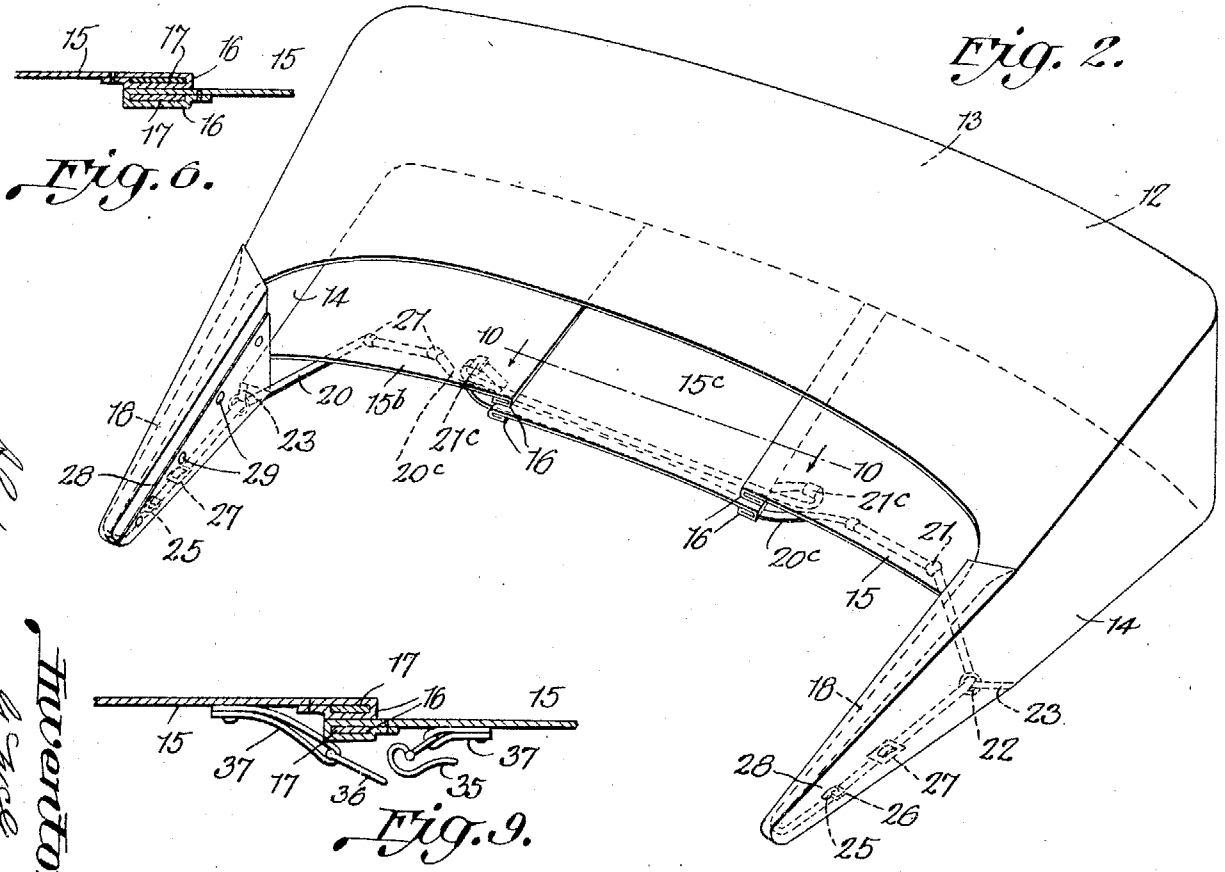
Inventor,
Alexander G. McGregor,
by Calver & Calver,
Attys.
THE NORRIS PETERS CO., PHOTO-LITHO., WASHINGTON, D. C.

A. G. McGREGOR.
AUTOMOBILE HOOD.
APPLICATION FILED OCT. 9, 1918.
Reissued Dec. 10, 1918.
14,559.
4 SHEETS—SHEET 3.
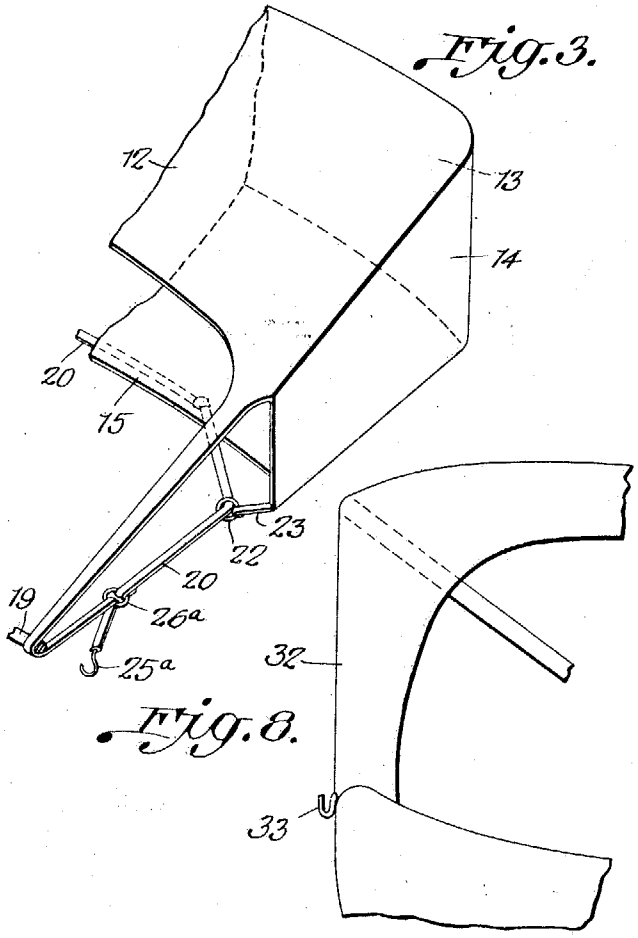
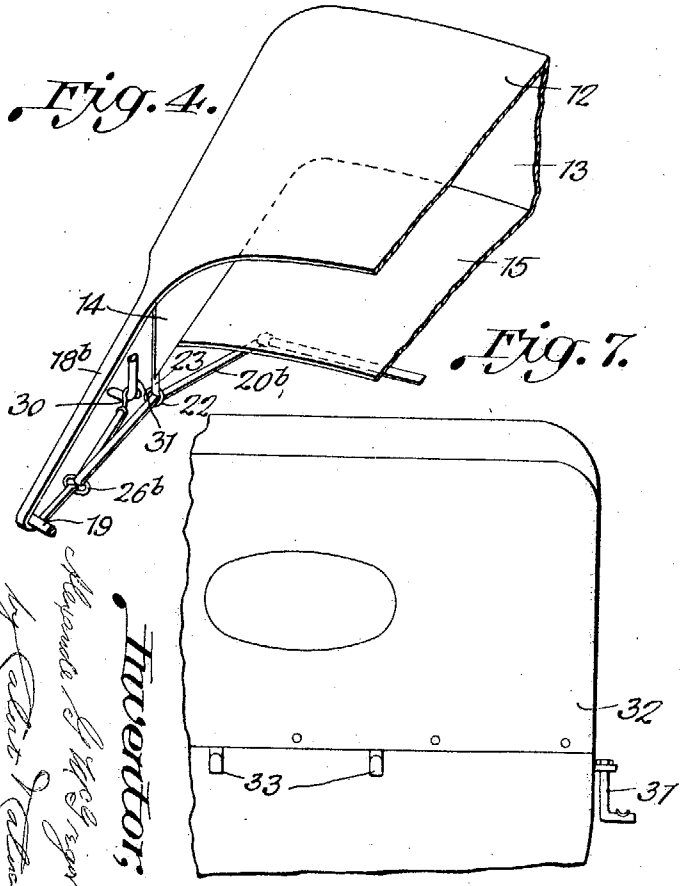
Inventor,
Alexander G. McGregor
by Calver & Calver
Attys.
THE MORRIS PETERS CO., PHOTO-LITHO., WASHINGTON, D. C.

A. G. McGREGOR.

AUTOMOBILE HOOD.

APPLICATION FILED OCT. 9, 1918.

Reissued Dec. 10, 1918.

14,559.

4 SHEETS—SHEET 4.

Inventor,

Alexander G. McGregor, by Calvert Kates

Attys.

THE NORRIS PETERS CO., PHOTO-LITHO., WASHINGTON, D. C.

UNITED STATES PATENT OFFICE.

ALEXANDER G. McGREGOR, OF WARREN, ARIZONA.

AUTOMOBILE-HOOD.

14,559. Specification of Reissued Letters Patent. Reissued Dec. 10, 1918.

Original No. 1,215,684, dated February 13, 1917, Serial No. 81,162, filed February 29, 1916. Application for reissue filed October 9, 1918. Serial No. 257,526.

*To all whom it may concern:*

Be it known that I, ALEXANDER G. McGREGOR, a citizen of the United States, residing at Warren, in the county of Cochise and State of Arizona, have invented or discovered certain new and useful Improvements in Automobile-Hoods, of which the following is a specification, reference being had therein to the accompanying drawings.

This invention relates to covers or hoods for enveloping the folded tops of automobiles or other vehicles and serving as protectors to exclude dust or water, and the invention has for its object to provide a hood or cover, of the class referred to, which may be conveniently placed and held in operative position, and may be readily removed when desired, all as will hereinafter more fully appear.

In the accompanying drawings Figure 1 is a perspective view of one form of the invention, and Fig. 2 is a similar view illustrating another and slightly different form of the invention. Figs. 3 and 4 are partial perspective views showing different forms of the draw or tension straps from that shown in Figs. 1 and 2. Fig. 5 is a detail view to show one of the loops of the bottom portion of the cover through which the tension straps pass. Fig. 6 is an enlarged detail sectional view on line 6—6, of Fig. 1. Figs. 7 and 8 are detail views illustrating hooks on the back curtain portion of the folded vehicle top for engaging looped portions of the tension straps. Fig. 9 is a detail view showing a modification of the means for closing the vent in the bottom portion of the hood or cover. Fig. 10 is an enlarged detail section on line 10—10, Fig. 2. Fig. 11 is a perspective view showing another form of the invention slightly different from the form illustrated in Figs. 1 and 2. Figs. 12 and 13 are detail views to illustrate means for drawing taut the hood or cover shown in Fig. 11.

Referring to the drawings, 12 denotes the top portion of the hood, 13 the back portion, 14 the side portions and 15 the bottom portion of the same. As clearly shown in the drawings these portions are all permanently associated together, either by being integral with each other or by having permanently attached edges. The bottom portion 15 is provided with one or more openings or vents afforded by the hems or adjacent but separated edge portions 16, and the said hems or separated edge portions will preferably be stiffened by thin strips 17 of sheet metal or other suitable material, so that they may be conveniently manipulated in drawing the same together or spreading them apart, although these stiffening strips which, though desirable, are not really necessary to the successful operation of other features of the invention. It will thus be understood that the hood is all practically in one permanent piece or part, excepting its vented bottom portion. The top portion 12 is provided with forwardly extending straps 18 which are adapted to be brought around over the usual pins 19 on which the rear bows of the vehicle top are pivoted. Attached to the edges 16 which form the vent or vents are draw straps 20 extending through loops 21 on the backs or lower faces of the bottom parts 15 of the hood, and also passing through rings 22, connected by short straps 23 with the lower bottom corners of the side portions 14 of the hood. One of these straps 20, and which is attached to the upper edge portion 16, passes through an opening 24 in the back portion 15 of the hood, and both of said straps are adapted to be suitably joined with the straps 18 by convenient connections herein shown as being similar to the well known fastenings used on overshoes, and consisting of hooks 25 attached to the ends of the straps 18 and adapted to engage buckles 26 attached to the ends of the straps 20. The doubled ends of the straps 20 preferably pass through adjusting buckles 27 which enable said straps to be lengthened or shortened, as may be desirable.

In the form of the invention shown in Fig. 2 the side portions 14 of the cover are provided with forward extensions 28 which preferably consist of outside and inside folds detachably secured together by means of snap fastenings 29.

In the modified form of the invention shown in Fig. 3 the strap $18^a$ is of sufficient length to pass through a ring or buckle $26^a$ on the strap 20, said strap $18^a$ being provided with a hook $25^a$ to engage a pin 19. This construction affords means whereby in tightening the strap $18^a$ there will be twice the pull on the strap 20 as compared with the construction shown in Figs. 1 and 2.

In the form of the invention shown in

Fig. 4 the strap $18^b$ is connected to the strap $20^b$ by means of a ring $26^b$ through which the strap $20^b$ is doubled, and the said strap $20^b$ is provided at its end with a hook 30 adapted to engage a stanchion 31 on the vehicle such as is usually provided for supporting the bows of a folded vehicle top. This construction affords twice the pull on the upper strap $18^b$ instead of giving the double pull on the lower strap, as shown in Fig. 3.

The back 32 of the vehicle is provided with hooks 33 with which looped portions $20^c$ of the straps 20 are adapted to be engaged, so as to attach the hood or cover to the said back of the vehicle at the said hooks 33 and thereby hold the hood or cover in place.

In the modified form of the invention shown in Fig. 9 the separated edges 16 of the lower parts 15 of the hood or cover may be secured together by means of hooks 35 and buckles 36 attached to the back portions 15 by loops 37 and forming a fastening such as that afforded by the hooks 25 and buckles 26 shown in Fig. 1.

In the double vent form of the invention shown in Figs. 2 and 10 the straps or cords $20^c$ pass through loops or keepers $21^c$ and are so connected to the back parts $15^b$ and $15^c$ that the vents may be closed by drawing on said straps or cords as denoted by the arrows.

Instead of providing the adjustable bottom portion of the hood with a vent or vents, comprising edges which may be more or less separated in opening out the hood laterally, the said bottom portion of the hood may be made dust-proof and adjustable or expansible and contractible laterally by being formed in one piece, as shown in Figs. 11, 12 and 13, and be provided with sufficient slack, as at $15^d$, to enable the said adjustable bottom portion to be opened out laterally more or less, when desired. This slack may be taken up, in drawing the bottom of the hood taut after said hood has been placed in its operative position over a folded vehicle top, by means of tension straps 20, such as are employed in the vent form of the invention heretofore described. These tension straps will be attached in any suitable manner to the bottom portion of the hood, and the points of attachment may be strengthened by reinforcing pieces $15^e$. The said tension straps 20 may be disposed as shown or otherwise, as may be found convenient.

The vent or vents afforded by the separated edges may extend from the front to the back of the bottom portion of the cover or hood, as denoted in Fig. 2, or approximately so, and thus said vent or vents may be opened widely, when desired, as above stated. The vent or vents may, however, extend only part of the way from the front to the back portion of the hood, as shown in Fig. 1, without departing from the invention, as such construction will enable the hood to be readily applied and removed.

It will be understood that any desired number of vents in the lower part of the hood may be provided, but one or two of such vents will, it is thought be found to be sufficient.

From the foregoing it will be apparent that the slack in the adjustable bottom portion of the hood or cover, or the vent or vents therein afforded by the separated edge portions 16, enables the hood or cover to be opened widely when it is to be adjusted in place over a folded vehicle top, or is to be removed, so that the said hood or cover may conveniently be placed in position and be easily removed when desired. The draw straps or tension straps 20, when disengaged from the straps 18, may be easily relaxed so as to enable the said bottom portion of the hood to be enlarged latterly or to be opened out more or less, and may be readily drawn up by pulling on the said draw straps or tension straps after the hood or cover has been placed in its operative position over a folded vehicle top. The said draw straps or tension straps may be lengthened or shortened, to effect a proper adjustment, by means of the buckles 27 through which the free ends of said straps may be drawn more or less, as will be readily understood.

It will also be apparent that, with the arrangement of straps shown, the tension may be so adjusted that the fabric composing the hood will be drawn taut, making the hood practically self-adjusting.

The parts 20, hereinbefore referred to, as draw straps, or tension straps, may, it will be understood, be either straps or cords, or may be partly straps and partly cords, as may be found to be preferable.

The side and back portions of the improved hood may be referred to as the smaller or minor parts of the hood, while the top and bottom portions thereof are the larger or major parts of the hood, so that the adjustable or expansible and contractible part with which the tension cords or straps are connected is a major part.

Having thus described my invention I claim and desire to secure by Letters Patent:

1. A hood or cover, for folded vehicle tops, consisting of top, back, side and bottom portions, the bottom portion of the said hood or cover being constructed with an opening or vent afforded by separated edges, all of the said portions of the hood being permanently associated so that said hood is practically all in one piece excepting its vented bottom portion, combined with draw or tension straps connected with said separated edges and extending thence forward, and straps connected to said top portion and with which said first-named straps are or may be detachably joined.

2. A hood or cover, for folded vehicle tops, consisting of top, back, side and bottom portions, the bottom portion of the said hood or cover being constructed with an opening or vent afforded by separated edges which extend approximately from front to back of said bottom portion, all of the said portions of the hood being permanently associated so that said hood is practically all in one piece excepting its vented bottom portion, combined with draw or tension straps connected with said separated edges and extending thence forward, and straps connected to said top portion and with which said first-named straps are or may be detachably joined.

3. A hood or cover, for folded vehicle tops, consisting of top, back, side, and bottom portions, the bottom portion of the said hood or cover being constructed with an opening or vent afforded by separated edges, all of the said portions of the hood being permanently associated so that said hood is practically all in one piece excepting its vented bottom portion, combined with draw or tension straps connected with said separated edges and passing through loops attached to said bottom portion, and extending thence forward, and straps connected to said top portion and with which said first-named straps are or may be detachably joined.

4. A hood or cover, for folded vehicle tops, consisting of top, back, side and bottom portions, the bottom portion of the said hood or cover being constructed with an opening or vent afforded by separated edges which extend approximately from front to back of said bottom portion, all of the said portions of the hood being permanently associated so that said hood is practically all in one piece excepting its vented bottom portion, combined with draw or tension straps connected with said separated edges and passing through loops and straps connected to said top portion and with which said first-named straps are or may be detachably joined.

5. A hood or cover, for folded vehicle tops, consisting of top, back, side and bottom portions, the bottom portion of said hood or cover being adjustable so as to be capable of being opened out more or less when the said hood or cover is to be applied to or removed from a folded vehicle top, combined with tension cords or straps, attached to said bottom portion, for drawing the latter taut when said hood or cover is in its operative position, and hooks on the back of the vehicle with which said cords or straps may be engaged for connecting said hood with said vehicle back.

6. A hood or cover, for a folded vehicle top, consisting of top, back, side and bottom portions of flexible material and having an open front, said hood or cover being constructed with an opening or vent afforded by separated edges extending from said open front toward the rear of one of its parts, said separated edges being provided with stiffening strips by which they are rendered practically inflexible, combined with means for closing said opening or vent by drawing said separated edges together.

In testimony whereof I affix my signature.

ALEXANDER G. McGREGOR.

Copies of this patent may be obtained for five cents each, by addressing the "Commissioner of Patents, Washington, D. C."